United States Patent
Goransson

[11] 3,788,142
[45] Jan. 29, 1974

[54] VELOCITY FLOWMETER
[75] Inventor: Nils Paul Goransson, Hjulsbro, Sweden
[73] Assignee: Saab-Scania Aktiebolag, Linkoping, Sweden
[22] Filed: June 7, 1972
[21] Appl. No.: 260,384

[30] Foreign Application Priority Data
June 11, 1971 Sweden.............................. 7575/71

[52] U.S. Cl. ................................................ 73/230
[51] Int. Cl. ............................................. G01f 1/12
[58] Field of Search...................... 73/229, 230, 231

[56] References Cited
UNITED STATES PATENTS
3,277,709  10/1966  Sipin ..................................... 73/230
3,354,718  11/1967  Boutillon .............................. 73/230
3,363,464  1/1968  Harringer et al. .................... 73/230

*Primary Examiner*—Herbert Goldstein
*Attorney, Agent, or Firm*—Ira Milton Jones

[57] ABSTRACT

A flow meter comprises a screw turbine having its axis parallel to stream flow, to be rotated thereby. The turbine carries axially oppositely facing clutch members and is free for limited axial movement. When rotating too fast for stream flow, it moves upstream, engaging one clutch member against a cooperating fixed clutch element, and is thereby decelerated. Rotating too slowly, its downstream drift engages the other clutch member against a second cooperating clutch element which is motor driven to rotate faster than highest expectable turbine speed, for acceleration of turbine rotation.

3 Claims, 4 Drawing Figures

PATENTED JAN 29 1974

VELOCITY FLOWMETER

This invention relates to a flowmeter for measuring the velocity of a fluid or the quantity of fluid per unit of time, comprising a rotor in the shape of a propeller or a turbine wheel which has its axis parallel to the fluid stream to be driven thereby, and which is mounted for limited axial movement by the fluid stream and in axial upstream as well as downstream directions such a flowmeter has a compensating device which, increases the rate of rotation upon movement of the rotor in the downstream direction, per unit time of the rotor to a correct number of revolutions corresponding to the fluid velocity and upon movement of the rotor in the upstream direction decreases the number of revolutions to the correct one. It is evident that until compensating correction of rotor speed is accomplished the rotor speed can be higher or lower than the correct number of revolutions. The firstmentioned instance occurs, e.g., when the stream velocity is reduced so rapidly that the rotor due to its momentum obtains a number of revolutions that during a short duration is higher than the correct one. The condition that the rotor normally obtains a lower number of revolutions than the correct one when not compensated occurs because of inherent stream and friction losses in the flowmeter and in the means for sensing the number of revolutions.

It is of course unsatisfactory that a flowmeter gives erroneous measuring values, and different methods and devices to provide the compensation mentioned in the introduction have therefore been suggested. In the U.S. Pat. specification No. 3.354.718 there is, e.g., described how the displacement of a turbine wheel in axial directions controls the number of revolutions of a motor connected to the turbine wheel. It has also been suggested to connect an auxiliary turbine, driven by the fluid flow that shall be measured, to the rotor shaft of the flowmeter to supply, by means of the auxiliary turbine, energy to the flowmeter and by this provide for a compensation of losses. This is, e.g., described in the U.S. Pat. No. 3,256,717 and in the French Pat. No. 1.475.825.

Known compensating devices are however comparatively complicated and as a consequence of this, expensive and use of them is justified mainly when great demands are made upon the compensation accuracy. It is therefore desirable to make a compensating device which is simple and robust and which gives a good compensating accuracy at a moderate cost.

The object of the invention is to provide such a compensating device, and this is attained in that the compensating device comprises a slipping clutch element which is driven by a motor operating at a number of revolutions that is higher than that of the rotor, and another slipping clutch element which is fixed in relation to the rotor, while the rotor has at least one slipping clutch element which is adapted to be brought to engagement with the slipping clutch element of the motor upon movement of the rotor in the downstream direction, for increasing the number of revolutions of the rotor, and which is adapted to be brought into engagement with the fixed clutch element upon movement of the rotor in the upstream direction, for decreasing the number of revolutions of the rotor.

The invention will be more fully explained in connection with the accompanying drawings in which.

Figure 1:
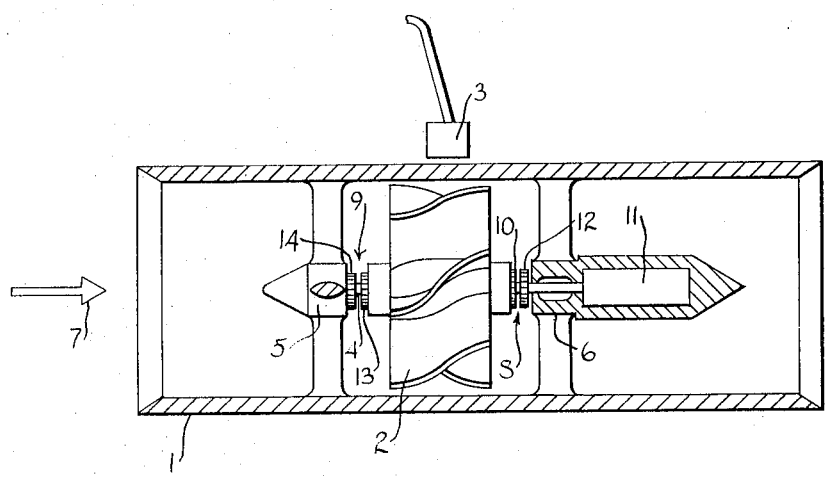
FIG. 1 is a side projection view partly in section showing a flowmeter in accordance with the invention.

The flowmeter shown in FIG. 1, which primarily is intended for determining the quantity of fluid flowing through the flowmeter per unit of time, comprises a tubular body 1 having a circular cross section. In the body there is coaxially and rotatably mounted a rotor 2 provided with vanes and driven by the fluid flow. The number of revolutions of the rotor per unit time is detected by means of a transducer 3 which is sensitive to the rotation of the rotor 2, and is indicated on an instrument not shown on the drawings. Since the cross section area of the body is known, the instrument can be graduated directly in units of fluid quantity per unit of time. The rotor is rigidly connected with its shaft 4 and this is in turn carried in two bearing housings 5, 6 rigidly attached to the body in such a way that the rotor is also somewhat movable in axial directions, i.e., in the upstream direction as well as in the downstream direction. The flow direction of the streaming fluid is from the left to the right as shown in the FIGURE by an arrow 7. In order to disturb the flow as little as possible in as much as the flow has to be laminar in order that the measurement shall be as correct as possible, the bearing housing 5 is provided with a cone having its point located in the upstream direction. In a similar way the bearing housing 6 has a conical shape with the point directed in the downstream direction.

If the number of revolutions of the rotor, for the reason mentioned in the introduction, is smaller than the correct number of revolutions corresponding to the stream velocity, the rotor is actuated by the flowing fluid with an axial force which is directed downstream, and if the number of revolutions of the rotor is higher than the correct one the rotor is actuated by an axial force directed upstream. These forces can displace the rotor in the directions the forces act in that the rotor is mounted for movement in axial directions as described above.

In accordance with the invention the flowmeter has a compensating device which comprises two friction slipping clutches 8, 9. The clutch 8 is brought to gradually increasing engagement when the rotor 2 moves axially in the downstream direction, while the clutch 9 acts in similar way when the rotor moves in the upstream direction. The clutch 8 consists of a slipping clutch element 10 that is rigidly connected with the rotor 2 and a driving clutch element 12 that is operatively connected with a motor 11 supported by the bearing housing 6. In a similar way the clutch 9 consists of a clutch element 13 that is rigidly connected with the rotor and of a fixed braking clutch element 14 that is rigidly connected with the bearing housing 5. The clutches 8, 9 are adjusted in such a way that the rotor 2 can freely rotate when it is in its central position. The motor 11 runs at a rotational speed that is higher than the highest rotational speed which the rotor is expected to obtain under the action of merely the fluid flow.

Figure 4:
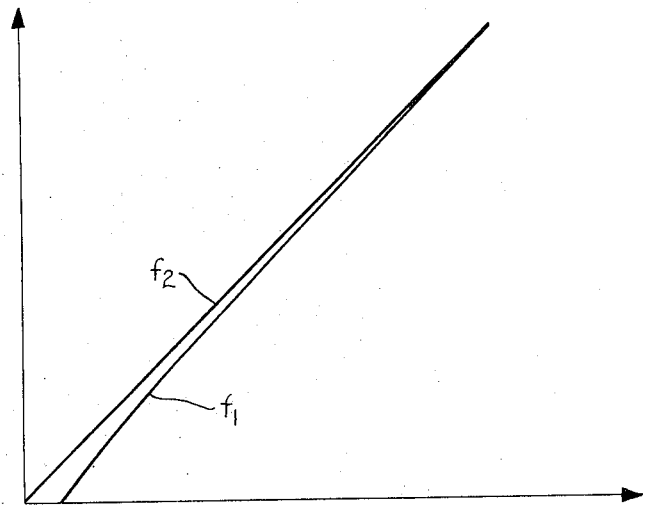
FIG. 4 is a diagram showing the relationship between the number of revolutions per unit time of the rotor and stream velocity in respectively an uncompensated flowmeter and a compensated flowmeter in accordance with the invention.

The compensation device with the flowmeter according to FIG. 1 operates in the following way:

When the rotor 2 is displaced in the downstream direction of the fluid stream which rotates the rotor, the friction slipping clutch 8 will thus be brought to a gradually increasing engagement which means that rotational energy can be transmitted from the motor 11 through the clutch 8 to the rotor 2. In this way the number of revolutions of the rotor per unit time is gradually increased until it is substantially equal to the correct number of revolutions corresponding to the velocity of the fluid stream. As the number of revolutions of the rotor gradually approaches the correct one, the rotor will move axially in the upstream direction to the neutral position, which means that the engagement of the clutch 8 gradually decreases with corresponding decreases in the rotational energy transmitted to the rotor from the motor 11. Should the velocity of the fluid stream decrease so rapidly that the rotor 2 by its momentum reaches a number of revolutions that is greater than the correct one, the rotor will so to say "screw" forwardly in the fluid and thus move axially in the upstream direction, which means that the slipping clutch 9 is gradually brought to increasing engagement. Since the clutch element 14 is firmly connected with the bearing housing 5, i.e., with an object fixed relatively to the rotor 2, rotational energy will be taken from the rotor so that is number of revolutions decreases. Since the engagement of the clutch 9 gradually decreases with the axial movement of the rotor in the downstream direction (which movement takes place as soon as the braking starts (the braking action gradually ceases so that the number of revolutions of the rotor approaches the correct one. By means of the two friction slipping clutches it is thus obtained that the number of revolutions of the rotor is automatically controlled so that it will constantly correspond to the correct one. This is of course something that one constantly tries to obtain, but as appears from FIG. 4, the compensation which is attained by a compensation device according to the invention is particularly effective at low velocities where the effect of the bearing and stream losses is high calculated in terms of percentage. As illustrated in FIG. 4, wherein the horizontal coordinate axis refers to fluid velocity and the vertical coordinate axis refers to number of revolutions of the turbine, the line $f_1$ shows the relationship between rotational speed of the turbine and the velocity of the fluid in an uncompensated flowmeter and the line $f_2$ corresponds to the same relationship attained with a compensated flowmeter in accordance with the invention.

For measurements the flowmeter shown in FIG. 1 can only be used if it can be mounted with its rotor shaft in a horizontal position since with a rotor carried in the above described manner gravity can affect the position of the rotor in the axial directions and thereby also affect the compensation in case the shaft is inclined.

Figure 2:
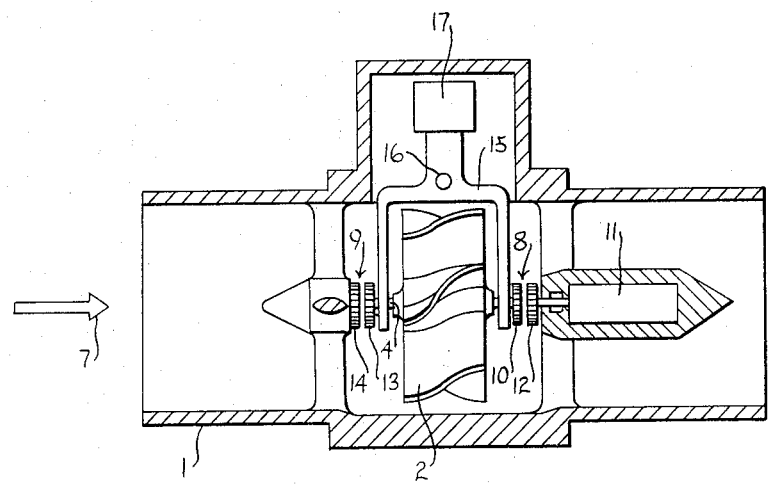
FIG. 2 is a similar view showing the invention applied to a flowmeter whose rotor is carried in such a way that the force of gravity does not affect the movements on the rotor in the axial directions.

In a flowmeter according to FIG. 2, wherein the elements that correspond to those in the flowmeter of FIG. 1, have the same reference numbers as in FIG. 1 the rotor 2 is, according to a special feature of the invention, rotatably carried in a holder 15 which in turn is swingably mounted around a shaft 16 that is firmly connected to the body 1. By means of a counterweight 17 which is adjustingly displaceable toward and away from the shaft 16, the rotor 2, the rotor shaft 4 and the clutch elements 10, 13 are counter balanced so that the flowmeter will be insensitive to gravity forces acting on the rotor.

The movement of the rotor in axial directions which is a requirement for the clutches 8 and 9 to be able to act for rotor speed compensation, is thus obtained according to FIG. 2 when the holder 15 turns around the shaft 16. Since the respective clutch element pairs 10, 12 and 13, 14 are positioned close to each other, the turning movement will be so short that although it is in a fact occurs along an arc it will have the effect of a purely axial movement.

Figure 3:
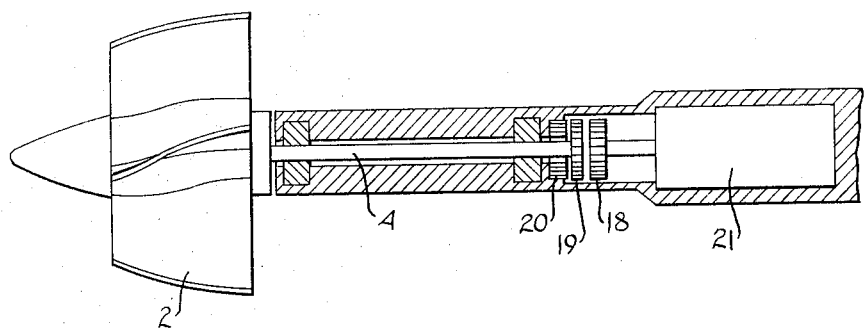
FIG. 3 is a side view of a flowmeter partly shown in section for measuring the stream velocity of the fluid.

The flowmeter shown in FIG. 3, which according to the above is intended for measuring fluid velocity, has for its compensation only three clutch elements 18, 19, 20. Of these the element 18 is connected with a motor 21 and is thus comparable with element 12 in FIG. 1. The clutch element 20 is like element 14 in FIG. 1 in that it is connected with a fixed point relative to the rotor. The slipping clutch element 19 is placed between the clutch elements 18 and 20 and is firmly connected with the rotor shaft 4 which is movably carried in axial directions. When the rotor 2 has a rotational speed that is too low and is thereby urged to the right under the action of a fluid flowing to the right in the FIGURE, the clutch elements 18, 19 are brought to gradually increasing engagement so that a compensation is attained in the same manner as above described. In the same way compensation is obtained by a gradually increasing engagement between the elements 19, 20 when the rotor 2 has a rate of revolution that is too high.

The invention is defined by the following claims:

1. A flowmeter for measuring the rate at which fluid flows in one direction through a duct, and which is of the type that comprises a turbine having helical vanes, mounted in the duct for free rotation with its rotational axis parallel to that of the duct, and sensing means mounted in proximity to the turbine and cooperating therewith to produce a signal that corresponds to the rotational speed of the turbine and hence to the rate of fluid flow, said flowmeter being characterized by:
   A. the turbine being mounted for limited free motion axially, as well as for free rotation;
   B. upstream and downstream clutch members coaxial with the turbine and constrained to partake of its axial and rotational motion,
      1. the upstream clutch member facing oppositely to said one direction and
      2. the downstream clutch member facing in said direction;
   C. a fixed clutch element in the duct at a location normally upstream from the upstream clutch member and engageable by the latter when the turbine propels itself upstream in consequence of its rate of rotation exceeding that corresponding to existing stream velocity, such exgagement resulting in deceleration of the turbine;
   D. A rotatable clutch element coaxial with the turbine at a location normally downstream from the downstream clutch member and engageable by the latter when the turbine drifts downstream in consequence of its rotational speed being lower than that corresponding to existing stream velocity; and
   E. drive means by which the rotatable clutch element is rotatably driven at a speed higher than is normally attained by the turbine so that the turbine is rotationally accelerated by engagement of the downstream clutch member with the rotatable clutch element.

2. In a flowmeter for measuring a function of the velocity of a fluid stream that flows in one direction, said flowmeter being of the type comprising a rotor and means mounting the rotor in a stream to be measured, with the rotor axis substantially aligned with the direction of stream flow, said mounting means providing for rotation of the rotor by the stream at a rate generally corresponding to stream velocity and also providing for limited substantially axial motion of the rotor in response to differences between prevailing rotor rotational speed and the rotor speed that accurately corresponds to prevailing stream velocity, means for effecting compensation of the rotational speed of the rotor to bring it into accurate correspondence with stream flow velocity at times when such differences exist, the last mentioned means comprising:

A. a rotatable clutch element coaxial with the rotor and facing in the axial direction opposite to that of stream flow;

B. a motor for driving the rotatable clutch element at a rotational speed higher than the highest expectable speed of the rotor;

C. a stationary clutch element fixed in coaxial relation to the rotor and spaced axially from the rotatable clutch element, said stationary clutch element facing in the axial direction of stream flow; and D. clutch element means constrained to coaxial rotation with the rotor and to axial motion therewith, said clutch element means having axially oppositely facing friction surfaces, one of which is engageable with said stationary clutch element upon axial upstream motion of the rotor to thus effect retardation of rotor speed, and the other of which is engageable with the rotatable clutch element upon downstream motion of the rotor to thus provide for augmentation of rotor speed.

3. The flowmeter of claim 2 wherein said rotatable clutch element and said stationary clutch element are at axially opposite sides of the rotor and facing the same, and said clutch element means has its said faces at axially opposite ends of the rotor, each in opposing relation to one of said clutch elements, further characterized by:

A. said means mounting the rotor comprising
  1. a yoke-like holder by which the rotor and said clutch element means are carried, the rotor and clutch element means being constrained to rotation relative to said holder, and
  2. mean providing a mounting for said holder by which the same is pivoted for swinging motion in directions substantially parallel to the rotor axis about a substantially horizontal swinging axis which is spaced a substantial distance from the rotor axis and is transverse thereto; and B. counterbalance means connected with said holder and disposed at the opposite side of said swinging axis from said holder, said counterbalance means substantially offsetting the effect of gravity upon the holder so that the rotor moves in its substantially axial directions only under the influence of fluid flow and is not affected by displacement of its axis from the horizontal.

* * * * *

UNITED STATES PATENT OFFICE
CERTIFICATE OF CORRECTION

Patent No. 3,788,142    Dated January 29, 1974

Inventor(s) Nils Paul Goransson

It is certified that error appears in the above-identified patent and that said Letters Patent are hereby corrected as shown below:

Column 1, lines 8-15: now reads
 As printed: "limited axial movement by the fluid stream and in axial upstream as well as downstream directions such a flowmeter has a compensating device which increases the rate of rotation upon movement of the rotor in the downstream direction, per unit of time of the rotor to a correct number of revolutions corresponding to the fluid velocity and upon movement of the rotor in the upstream direction decreases the number of revolu-"

Should read: --limited axial movement by the fluid stream in axial upstream as well as downstream directions. Such a flowmeter has a compensating device which, upon movement of the rotor in the downstream direction, increases the rate of rotation of the rotor to a correct number of revolutions per unit time corresponding to the fluid velocity and upon movement of the rotor in the upstream direction decreases the number of revolu--

UNITED STATES PATENT OFFICE
CERTIFICATE OF CORRECTION

Patent No. 3,788,142              Dated January 29, 1974

Inventor(s) Nils Paul Goransson                Page -2-

It is certified that error appears in the above-identified patent and that said Letters Patent are hereby corrected as shown below:

Column 3, line 30:   "is" should read --its--

Column 3, line 34:   Parenthesis is reversed

Column 3, line 43:   the word "flow" should be inserted after "low"

Column 4, line  1:   "toward" should read --towards--

Column 4, line 12:   "is" should be deleted

Column 4, line 13:   "a" should be deleted at beginning of line.

Column 4, line 58:   "exgagement" should read --engagement--

Signed and sealed this 17th day of September 1974.

(SEAL)
Attest:

McCOY M. GIBSON, JR.                C. MARSHALL DANN
Attesting Officer                   Commissioner of Patents